July 14, 1925.

H. F. SCHMIDT

BALANCING MACHINE

Filed July 5, 1922

1,546,030

WITNESSES:

H. F. Schmidt
INVENTOR

BY
ATTORNEY

Patented July 14, 1925.

1,546,030

UNITED STATES PATENT OFFICE.

HENRY F. SCHMIDT, OF PHILADELPHIA, PENNSYLVANIA, ASSIGNOR TO WESTING-HOUSE ELECTRIC AND MANUFACTURING COMPANY, A CORPORATION OF PENNSYLVANIA.

BALANCING MACHINE.

Application filed July 5, 1922. Serial No. 573,049.

*To all whom it may concern:*

Be it known that I, HENRY F. SCHMIDT, a citizen of the United States, and a resident of Philadelphia, in the county of Philadelphia and State of Pennsylvania, have invented a new and useful Improvement in Balancing Machines, of which the following is a specification.

My invention relates to balancing machines and it has for its object to provide an improved method and apparatus for driving a body to be balanced so that balancing may be more expeditiously effected than heretofore.

Figure 1:
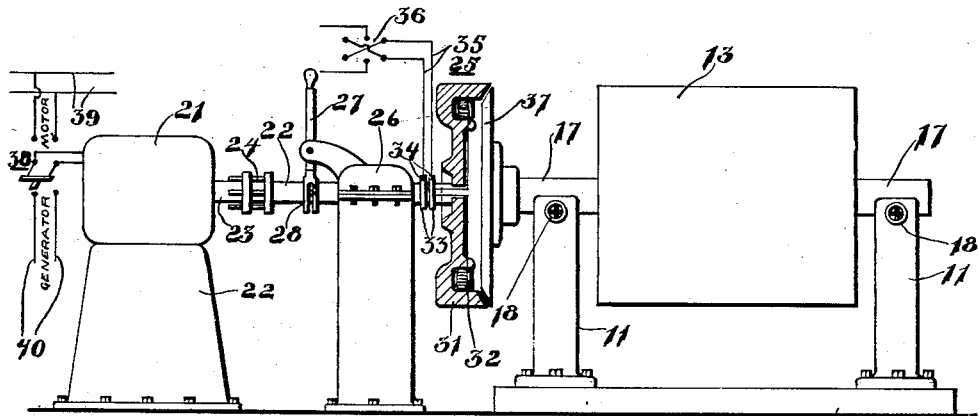
Figure 2:
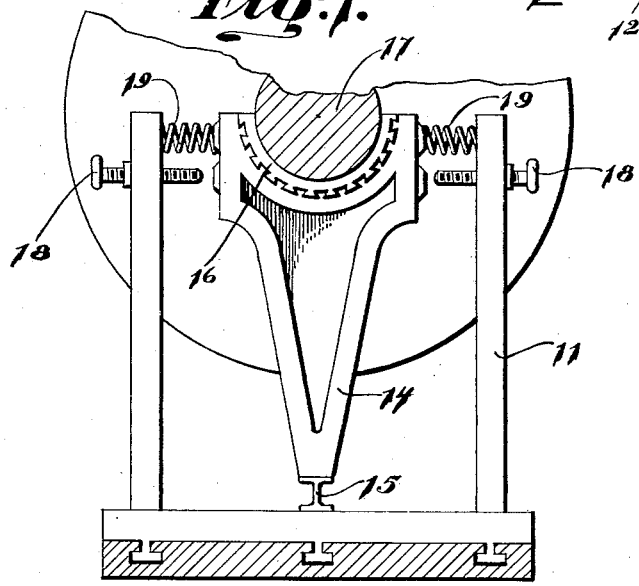

Apparatus embodying features of my invention is illustrated in the accompanying drawings, forming a part of this application, in which: Fig. 1 is a side elevation of a balancing machine showing my improved driving mechanism therefor with one of the clutch elements shown in section; and Fig. 2 is an end elevation of the balancing machine viewed from the right of Fig. 1.

In the operation of balancing machines, it has been found to be highly desirable to be able to disconnect the rotor when the balancing speed is slightly exceeded so that the rotor may be allowed to drift down through the balancing or synchronous speed at which balancing observations are made. After the body has passed through synchronous speed, it may be desirable to reconnect it to the driving motor. It is also desirable, particularly if masses are added to or removed from the ends of a body to be balanced, to retard the body as quickly as possible. I, therefore, drive the body to be balanced by a dynamo electric machine, which is connected to the body by means of a magnetic clutch, preferably of the ring type. This type of clutch permits of the ready connection and disconnection of the body with respect to the motor while the parts are rotating.

The dynamo-electric machine is capable of acting as a generator to absorb the kinetic energy of a rotating body, whereby the latter may be dynamically braked.

Referring to the drawings for a more detailed description of my invention, I show a balancing machine at 10 which includes pedestals 11, adjustable with respect to a bedplate 12 so as to accommodate rotors 13 of different lengths. Pendulum members 14 are flexibly connected to the pedestals 11 by any suitable means, as, for example, by I-beam connections 15, and the pendulum members are provided with bearings 16 at their upper ends for the trunnions 17 of a rotor 13.

Each pedestal 11 is provided with stop screws 18 for the purpose of holding the pendulums 14 against vibration when desired, and springs 19 are interposed between the pendulums and the pedestals for the purpose of amplifying vibrations when the speed of the rotor is in resonance with the springs. The rotor is driven by means of a dynamo-electric machine 21 carried by a suitable stationary support 22.

My improved operating mechanism arranged between the dynamo-electric machine 21 and the rotor 13 includes a shaft member 22 which is slidably connected to the armature shaft 23 by a suitable slip-coupling 24, and it is adapted to be connected to the rotor 13 by means of a magnetic clutch of the ring type, at 25, the shaft member 22 being supported by any suitable bearing construction 26. The shaft member may be moved longitudinally for purposes, hereinafter set forth, by any suitable means, as, for example, by the hand-lever 27 having a yoke 28, which engages a shifting element carried by the shaft 22.

The magnetic clutch at 25 is preferably of the ring type for the reason that the armature or adapter element thereof may be made relatively light, thereby reducing to a minimum the introduction of errors, due to unbalanced clutch parts, in the operation of balancing. The magnetic clutch comprises a ring magnet element 31 having a coil 32 supplied with current by means of the slip-rings 33, the brushes 34, and the circuit 35, the latter including a reversing switch 36. The reversing switch 36 is employed so that, when the circuit for the magnet element is broken, the latter may be quickly demagnetized by causing current to flow therethrough in an opposite direction.

An armature element 37 is coupled to a rotor trunnion 17 in any suitable manner so that, when the magnet member 31 is in proper position and the circuit therefor is closed, the dynamo-electric machine 21 may drive the rotor 13 therethrough. The armature element 37 preferably takes the form of an adapter plate which is carefully balanced statically and dynamically, whereby a number of adapters or plates arranged to fit rotor trunnions of varying sizes and a single magnet member 31 may be provided.

The dynamo-electric machine 21 may act as a generator to serve as a dynamic brake to retard the body being balanced. I, therefore, show the dynamo-electric machine provided with a suitable two-way switch, at 38, whereby it may be connected to the circuit 39, when acting as a motor, or to the circuit 40, when acting as a generator.

In operation, the pendulums 14 are first secured firmly in place by tightening the screws 18. The motor 21 is started and the magnetic clutch at 25 is energized. The speed is accelerated until the balancing speed for the rotor is slightly exceeded, whereupon the magnetic clutch at 25 is disconnected and the screws at 18 are retracted so that observations may be had as the rotor drifts down through its balancing speed.

Should it be desired to reconnect the motor 21 and the rotor 13 as soon as the latter drops below balancing speed, either for the purpose of accelerating the rotor above its balancing speed, or for the purpose of dynamically braking it, this may be readily done.

When disconnecting the clutch, the circuit 35 is first broken and then closed for a short interval of time by operating the reversing switch 36 in order to demagnetize the magnet element 31 to permit of the ready movement of the shaft element 22 by means of the lever 27, the slip-joint connection 24 permitting of this movement. In this way, the magnet element 31 may be shifted away from the adapter plate element 37 a sufficient distance to prevent the latter from being affected in any way by the residual magnetism of the magnet element. When it is desired to again reconnect the clutch, the shaft element 22 is shifted by means of the hand lever 27 to bring the magnet element 31 closely adjacent to the adapter plate element 37.

When it is desired to retard the rotor, the switch 38 is disconnected from the motor leads 39 and connected to the generator leads 40, whereupon the dynamo-electric machine acts as a generator to quickly absorb the kinetic energy of the rotor.

While I have shown and described a balancing machine of the pendulum type, it is to be understood that this is for illustrative purposes only and that my improved means and method for driving a rotor may be used wherever the characteristics thereof are desirable.

From the foregoing, it will be seen that I have devised a driving mechanism for the balancing machine which permits of the ready connection and disconnection of the rotor while in operation so that observations may be repeatedly made or so that the driving motor may serve as a dynamic brake in order to quickly stop the rotor.

While I have shown my invention in but one form, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In a balancing machine for placing a rotor in static and dynamic balance, driving mechanism for rotating the body comprising a motor, said motor being adapted to be driven as a generator, a magnetic clutch for connecting and disconnecting the motor with respect to the rotor and means for controlling the driving mechanism whereby the motor may operate as a generator to retard the rotor.

2. In a balancing machine for placing a rotor in static and running balance, the combination of a dynamo-electric machine, a magnetic clutch for connecting the dynamo-electric machine to the rotor, and a controlling switch for the dynamo-electric machine, whereby the latter may operate as a motor to drive the rotor or as a generator to retard the rotor.

3. The combination, with a balancing machine and a motor for rotating a rotor carried by the machine, of mechanism for connecting the motor to the rotor comprising a shaft, a slip-joint connection between the shaft and the motor, a magnetic clutch connection between the shaft and rotor, and means for shifting the shaft after the circuit for the magnetic clutch is broken, whereby the rotor may rotate freely at synchronous speed without being affected by residual magnetism.

4. The combination, with a rotor adapted to be balanced at a given speed while rotating freely and a motor for driving the rotor, of a magnetic clutch including a magnet element connected to the motor, an armature element carried by the rotor, means for disconnecting the clutch elements, and means for separating the magnet element so that the rotor may rotate freely and unaffected by the residual magnetism of the magnet element.

5. In a balancing machine, the combination of a vibratory supporting element for a body to be balanced, means for holding the element against vibration, an electric motor for driving the rotor, and a magnetic clutch for connecting the motor with the rotor, whereby the latter may be readily connected or disconnected while the rotor is rotating for the performance of balancing operations or for quickly braking the rotor by driving the motor as a generator.

6. In a balancing machine for a rotor to be placed in balance, a dynamo-electric machine, a circuit for delivering electric energy to the dynamo-electric machine to operate it as a motor, a circuit to receive electric energy generated by said machine when it is operated as a generator, means for connecting the dynamo-electric machine to either circuit, and a clutch for connecting and disconnecting the dynamo-electric machine to the rotor.

7. In a balancing machine for a rotor to be placed in balance, a dynamo-electric machine, a circuit for delivering electric energy to the dynamo-electric machine to operate it as a motor, a circuit to receive electric energy generated by said machine when it is operated as a generator, means for connecting the dynamo-electric machine to either circuit, and a magnetic clutch for connecting and disconnecting the dynamo-electric machine to the rotor.

8. In a balancing machine for a rotor to be placed in balance, a dynamo-electric machine, a circuit for delivering electric energy to the dynamo-electric machine to operate it as a motor, a circuit to receive electric energy generated by said machine when it is operated as a generator, means for connecting the dynamo-electric machine to either circuit, and a magnetic clutch including longitudinally separable clutch elements for connecting and disconnecting the dynamo-electric machine to the rotor.

9. In a balancing machine for a rotor to be placed in balance, a dynamo-electric machine, a circuit for delivering electric energy to the dynamo-electric machine to operate it as a motor, a circuit to receive electric energy generated by said machine when it is operated as a generator, means for connecting the dynamo-electric machine to either circuit, a magnetic clutch for connecting and disconnecting the dynamo-electric machine to the rotor, and a circuit for the clutch including a reversing switch, whereby the clutch may be quickly de-energized when disconnecting.

10. The process of balancing a rotary body which consists in rotating the body to a speed above a predetermined speed by means which absorbs power from an external source, in allowing the body to rotate freely and drift through the predetermined speed, and in absorbing the kinetic energy of the body by said means in order to retard it.

11. The process of balancing a body at a given speed which consists in bringing the speed of the body above the speed by means of a magnetic clutch, in breaking the circuit and demagnetizing the clutch, and in separating the clutch elements so that the body may rotate freely at the given speed without being affected by residual magnetism.

12. The process of balancing a rotary body at a given speed which consists in rotating the body to a speed above the predetermined speed by a dynamo-electric machine acting as a motor, in disconnecting the dynamo-electric machine from the body in order to allow the latter to rotate and drift freely down through the predetermined speed, in reconnecting the body to the dynamo-electric machine after its speed is reduced below the predetermined speed, and in operating the dynamo-electric machine as a generator by the body to absorb the kinetic energy of the latter.

In testimony whereof, I have hereunto subscribed my name this 30th day of June 1922.

HENRY F. SCHMIDT.